United States Patent
Mickelsson et al.

[11] 3,830,485
[45] Aug. 20, 1974

[54] WORK TABLE FOR MACHINE TOOLS

[76] Inventors: Sven-Mikael Mickelsson, Box 5770, Bollnas; Sture Hall, Prastvagen 2, Alfta, both of Sweden

[22] Filed: Nov. 2, 1972

[21] Appl. No.: 303,144

[30] Foreign Application Priority Data
Nov. 5, 1971 Sweden.............................. 14139/71

[52] U.S. Cl..................... 269/25, 29/1 A, 90/58 R
[51] Int. Cl............................................... B23q 3/06
[58] Field of Search ......... 90/58 R; 29/1 A; 269/91, 269/92, 93, 94, 25, 99, 100

[56] References Cited
UNITED STATES PATENTS

| | | | |
|---|---|---|---|
| 1,420,321 | 6/1922 | Klausmeyer | 90/58 |
| 2,421,957 | 6/1947 | Mead | 269/94 X |
| 3,192,600 | 7/1965 | Jones | 29/1 A |

FOREIGN PATENTS OR APPLICATIONS

| | | | |
|---|---|---|---|
| 1,375,736 | 9/1964 | France | 269/91 |
| 656,572 | 1/1963 | Canada | 29/1 A |
| 512,865 | 9/1939 | Great Britain | 90/58 |
| 834,171 | 3/1952 | Germany | 29/1 A |

*Primary Examiner*—Andrew R. Juhasz
*Assistant Examiner*—Z. R. Bilinsky

[57] ABSTRACT

A work table for machine tools, such as radial drilling machines and the like, the table having grooved areas in its top and side surfaces, the groove or grooves extending for a distance below said surfaces and from one end of the table to its other end. A clamping bar is located in each groove, the groove or grooves having side walls mainly perpendicular to its surfaces, the clamping bar being guided by said walls. Said bar is movable in the groove toward or away from the surface of the table, the clamping bar extending along the length of the groove and is provided in its surface facing the surface of the table with an undercut or T-groove for at least a substantial part of its length.

4 Claims, 7 Drawing Figures

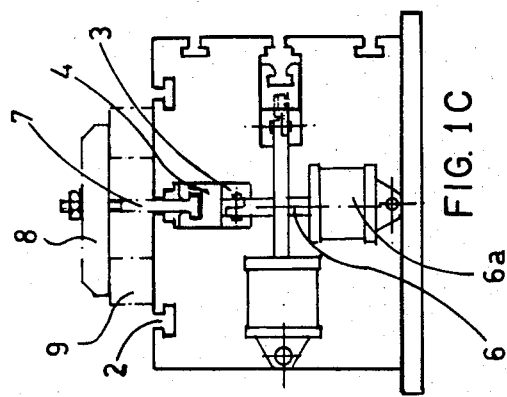
FIG. 1C
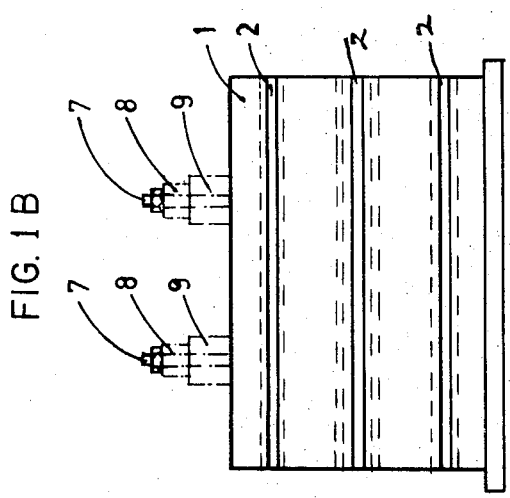
FIG. 1B
FIG. 1A

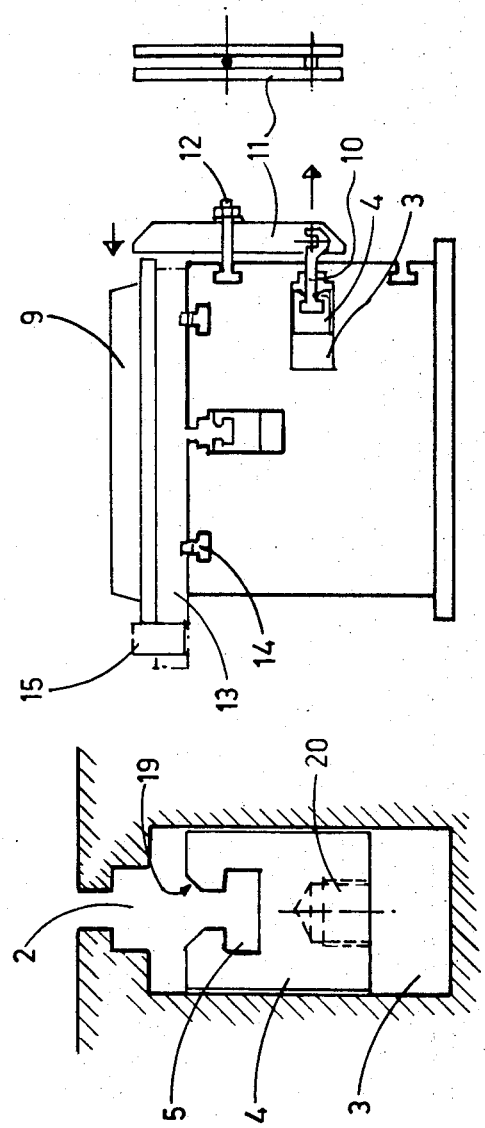

WORK TABLE FOR MACHINE TOOLS

It is known to provide a work table for a machine tool with T-grooves into which the heads of clamping bolts are fitted so that the work piece is secured by the tightening of nuts on the end of each bolt by the use of a wrench. This manual tightening operation requires considerable effort especially since it, in some cases, is carried out while the worker is in an uncomfortable position, and it is also time-consuming.

The present invention relates to a work table for machine tools, such as radial drilling machines, milling machines and the like, and which is designed and equipped in such a way that quick, secure and comfortable chucking of work pieces is obtained.

Reference is to be had to the accompanying drawings in which

FIG. 1 has three views, that shown at A being a top plan view of the table; that shown at B being a front view and that shown at C being an end view.

Figure 4:
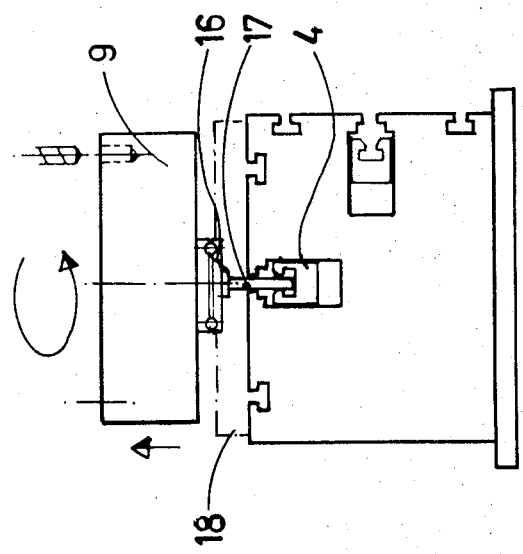
Figure 5:
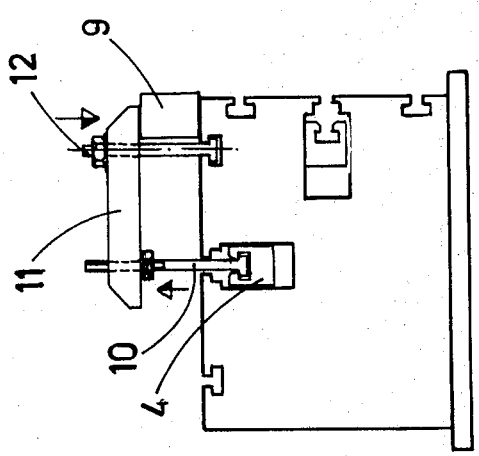

FIG. 2 is a detailed view of the chucking means for work pieces with which the table is equipped, and FIGS. 3 to 5 give various examples of the clamping of work pieces.

In a work table 1 made according to FIG. 1, undercut or T-grooves 2 of conventional form are provided both in the upper surface of the table and in one of its vertical sides. In the example shown in the drawings there are three longitudinal T-grooves in the top surface of the table and the same number of similar grooves in one side surface.

Of the three T-grooves in the top surface of the table, the middle groove is without a bottom and it connects downwardly with a groove which is wider than the T-groove and which continues below said T-groove in the form of a cavity or recess 3 having a greater cross section in the shape of a standing rectangle (see FIG. 2). In the cavity 3 is fitted a clamping bar 4, the upper surface of which is provided with an undercut or T-groove 5 which extends in the longitudinal direction of the clamping bar. The clamping bar 4 can be raised or lowered in the cavity 3 with the aid of two power transmitting devices 6. These devices are located below the clamping bar 4 and at a distance from each other in the longitudinal direction of the clamping bar. These devices act on the clamping bar and are in their turn activated by one or more power sources 6a.

In the T-groove of the clamping bar 4 are inserted, at a distance from each other, two T-groove bolts 7 (FIG. 1) of a standard type, with their heads located in the T-groove 5 and with nuts fitted on their opposite ends. The clamping bolts or T-groove bolts 7 act on clamping devices 8 which transmit a clamping force to and secure in position one or more work pieces 9. The clamping force is obtained by moving the clamping bar 4 downwardly with the aid of the power-transmitting devices 6.

The middle undercut or T-groove in one of the vertical surfaces of the work table is, in the same manner as the middle T-groove in the top surface, provided with a connecting cavity or recess 3 and a clamping bar 4 with power transmitting devices 6 acting on it. FIG. 3 shows how a special T-groove bolt 10 has been fitted in the T-groove of the clamping bar and is pivotally connected to a clamping device 11, which is also pivotally connected to the chuck table by means of a conventional T-groove bolt 12 fitted in the uppermost T-groove in the side of the work table. A supporting bar 13, or two supporting bars located at a distance from one another, are placed on the work table and are secured horizontally with the aid of key sections 14. The supporting bars 13 are provided with end stops 15, suitably adjustable in the longitudinal direction of the supporting bars. A work piece 9 is placed on the supporting bars, one end of the work piece resting against the end stops 15. With the aid of the power transmitting devices the clamping bar 4 and the special bolt 10 are pushed outwardly, causing the clamping device 11, which pivots around the bolt 12, to move with its upper end inwardly and toward the work piece 9 and acting to clamp it against the end stops 15.

With this clamping arrangement it will not, in many cases be necessary to mount a vise on the work table. The clamping surfaces of a vise have a given width, but with a device made in accordance with the present invention it is possible to use one or two clamping devices 11 with their associated bolts 10, 12 and to fit the clamping devices at any desired distances from one another along the whole length of the clamping bar 4. Futhermore, one supporting bar 13, or two of such bars at any desired distance from one another, may be used. In the latter case the space between the bars can be used for receiving portions of the work piece which project downwardly, especially in case the bottom surface of the work piece is not flat. A very variable and important chucking device is thus obtained, which in many cases is superior to a vise.

FIG. 4 shows how the device operates in the manner described in reference to FIG. 3. A work piece 9 can be clamped against the top surface of the work table by moving the clamping bar 4, located below the surface of the table, upwardly and in the manner described in reference to FIG. 3, converting the force acting upwardly into a force acting downwardly, for clamping the work piece against a table. This arrangement makes it possible to clamp the work piece close to the edge of the work table and within convenient reach of the operator.

When drilling is carried out in large work pieces, the holes farthest away from the operator are often hard to reach and to drill because of an uncomfortable working position. FIG. 5 shows an arrangement for lifting and turning the work piece, so that all the operations are carried out near the front edge of the work table. A work piece 9 is shown in the raised position, resting on a turntable 16, the lower end of its shaft 17 resting on the bottom of the T-groove of the clamping bar 4 when the clamping bar 4 is moved upwardly. In this position the work piece can be easily turned or rotatively moved. When the work piece is moved to bring it to the working position by moving the clamping bar 4 downwardly, it may for example, be caused to rest upon two supporting bars 18, one of which can be located on each side of the turntable. Large and heavy work pieces will, as a rule, need no clamping, but if desired, two T-groove bolts can be fitted in the T-groove of the clamping bar 4, one on each side of the turntable, which bolts will secure the work piece against the supports when the clamping bar is lowered and which will automatically loosen their grip on the work piece when the clamping bar is raised. The shaft of the turntable 17 should be made so that it loses contact with the bottom of the T-groove in the clamping bar before the downward movement of the clamping bar is completed and the T-groove bolts apply pressure on the work piece, and will not rest against the bottom of the T-groove again until the clamping bar has moved a short distance upwardly so that the grip of the T-groove bolts is loosened before the work piece is lifted. The shaft 17 must be provided with a base portion extending a sufficient distance in the longitudinal direction of the T-groove to prevent overturning in this direction. In the transverse direction the shaft is guided by the walls of the T-groove in the chuck table.

Lifting the work piece can be done for other purposes than turning it around, in which case the turntable 16 may be replaced by a simpler device with a supporting plate which cannot be turned. Such lifting may, for example, be necessary in order to put a chain or sling under the work piece for removing it from the chuck table in case that it has been brought to rest directly on the table.

With the power transmitting devices it should be possible to move the clamping bar 4 with the required amount of force both in the direction of the surface of the work table and in the opposite direction. The force in both directions should be adjustable to suit different clamping requirements. A prototype chuck table was equipped with control devices allowing stepless adjustment from 0 to 7,500 kp, this being mentioned only as an example. For moving the clamping bar 4 several different types of power sources 6a and power transmitting devices 6 can be used. FIG. 1 shows a hydraulic or pneumatic device with a piston rod acting directly on the clamping bar. Other power sources may be used, as well as power transmitting devices in the form of linkage or lever systems, eccentric devices or the like. The power sources may be located inside or at a distance from the chuck table. Control devices connected to the power sources are located in a suitable place on or near the work table and may also be built into a portable control box or the like.

As mentioned above each clamping bar 4 is acted on by two power transmitting devices 6, located at a distance from one another in the longitudinal direction of the clamping bar. These devices should operate independently of each other in such a way that the length of the pulling or pushing movement of one device can differ from the length of the simultaneous movement of the other device, but the tractive force or pressure transmitted to the clamping bar 4 should be the same for both devices. In this way the clamping bar, which moves freely in the cavity 3, may assume an oblique position in said cavity; that is it may be raised or lowered more at one end than at the other in order to compensate for differences in the effective length of the T-groove bolts 7 or 10, 12 caused by different positions of the nuts on two or more co-operating bolts. This is an important advantage, since when clamping a work piece it is only necessary to make a very quick and approximate adjustment with the help of the nuts, whereupon operation of the clamping bar 4 gives instantaneous final adjustment and the same clamping force at all clamping points.

When a work piece is clamped in the conventional way, which means that the operator will tighten each nut with a wrench as much as it requires, the tightening of each nut will, according to tests made require 8–10 seconds or 16–20 seconds for two bolts. With a work table made in accordance with the present invention the same operation takes only fractions of a second. Approximately the same amount of time is saved when loosening the work piece. When a series of identical work pieces is machined and each work piece, after adjustment with the nuts has been made for the first work piece, can be secured or loosened in a moment, very substantial amounts of time are saved.

Instead of two T-groove bolts 7, as shown in FIG. 1, only one such bolt can be used, if for example, only two of the work pieces 9 in FIG. 1 are to be clamped or if, for example, the bolt can be passed through a hole in the center of a work piece.

In the structures shown in the drawings there is one clamping bar 4 located below the top surface of the work table and another one at the vertical side of the table, which in most cases is sufficient. The number of clamping bars may however be increased, especially when large work tables are used. The number of fixed T-grooves 2 may also be varied.

The combination of a fixed T-groove and a connecting groove 3 in the same center line, the latter groove fitted with a clamping bar 4 which also has a T-groove, increases the usefulness of the work table when work is carried out in a fixture, for example. The fixture is then secured in the conventional manner with bolts in the fixed T-groove 2 while the work pieces are secured and loosened in the fixture in the way described above with the aid of bolts in the T-groove of the clamping bar 4. The clamping mechanism can thus in many cases be simplified, that is jigs and fixtures can be made simpler and less expensive.

The T-groove in the clamping bar 4 should preferably be beveled as at 19 (FIG. 2) at the end communicating with the surface of the clamping bar, so that the opening of the groove widens toward the surface of the bar. This serves to guide cuttings etc. resulting from the operations, to the bottom of the T-groove from whence they can easily be removed and so they do not enter between the walls of the cavity 3 and the clamping bar 4.

The clamping bar 4 may be provided with holes 20 (FIG. 2) or the like for connecting power transmitting devices for the operation of the clamping bar.

The invention is not to be limited to the examples shown since modifications are possible within the scope of the invention.

What is claimed is:

1. A work table for machine tools, such as drilling machines, milling machines and the like, comprising:
 a. a T-grooved table surface having at least one T-recess thereof located at a spaced distance from the table surface and opening into a widened recess extending along said T-recess;
 b. a clamping bar reciprocably guided in said widened recess and extending longitudinally thereof;
 c. said clamping bar having a longitudinal T-groove facing said T-recess;
 d. T-bolts having their heads engaging the T-groove of said clamping bar;
 e. the opposite end of said T-bolts projecting beyond said T-grooved table surface;
 f. clamping means adjustably mounted on said opposite ends of the T-bolts for holding a workpiece; and
 g. means for exerting a clamping force on said clamping bar to clamp the workpiece firmly to said table surface.

2. A chuck table according to claim 1, in which the clamping bar is actuated by power transmitting devices which are connected with and act on the clamping bar at points located at a distance from each other in the longitudinal direction of the clamping bar.

3. A chuck table according to claim 1, wherein the portion of the side walls of the T-groove in the clamping bar and which is closest to the surface of said clamping bar, is beveled, so that the T-groove widens outwardly toward said surface.

4. A chuck table according to claim 1, having a substantially horizontal T-grooved surface and a substantially vertical T-grooved surface.

* * * * *